(12) United States Patent
Wu et al.

(10) Patent No.: US 9,826,331 B2
(45) Date of Patent: Nov. 21, 2017

(54) METHOD AND APPARATUS FOR SOUND PROCESSING IN THREE-DIMENSIONAL VIRTUAL SCENE

(71) Applicant: TENCENT TECHNOLOGY (SHENZHEN) COMPANY LIMITED, Shenzhen, Guangdong (CN)

(72) Inventors: Xiayu Wu, Shenzhen (CN); Rong Wan, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 0 days.

(21) Appl. No.: 15/033,013

(22) PCT Filed: Feb. 26, 2015

(86) PCT No.: PCT/CN2015/073282
§ 371 (c)(1),
(2) Date: Apr. 28, 2016

(87) PCT Pub. No.: WO2015/127890
PCT Pub. Date: Sep. 3, 2015

(65) Prior Publication Data
US 2016/0360334 A1 Dec. 8, 2016

(30) Foreign Application Priority Data

Feb. 26, 2014 (CN) .......................... 2014 1 0067291

(51) Int. Cl.
*H04R 5/02* (2006.01)
*H04S 5/02* (2006.01)
(Continued)

(52) U.S. Cl.
CPC .............. *H04S 7/303* (2013.01); *H04S 3/008* (2013.01); *H04S 7/30* (2013.01); *H04S 2400/01* (2013.01);
(Continued)

(58) Field of Classification Search
CPC .. H04S 2420/01; H04S 1/005; H04S 2400/11; H04S 7/304; H04S 7/302; H04S 2420/03
(Continued)

(56) References Cited

U.S. PATENT DOCUMENTS 6,795,556 B1 * 9/2004 Sibbald ................... H04S 1/002
381/1
8,160,265 B2 4/2012 Mao
(Continued)

FOREIGN PATENT DOCUMENTS

| CN | 1440629 A | 9/2003 |
|---|---|---|
| CN | 101521843 A | 9/2009 |

(Continued)

OTHER PUBLICATIONS

International Search Report in international application No. PCT/CN2015/073282, dated May 13, 2015.
(Continued)

*Primary Examiner* — George Monikang
(74) *Attorney, Agent, or Firm* — Syncoda LLC; Feng Ma; Junjie Feng

(57) ABSTRACT

The present disclosure discloses a method and an apparatus for sound processing in a three-dimensional virtual scene. The method includes: acquiring, by a three-dimensional program engine, a sound processing request of a sound source point in a virtual scene; invoking a corresponding head-response transfer function (HRTF) according to a three-dimensional coordinate position relationship between the sound source point and a sound recipient in the virtual
(Continued)

scene; modifying a parameter value of the HRTF according to the virtual scene where the sound source point is located; and performing filtering and delaying processing on a sound signal of the sound source point by using the modified HRTF. In the present disclosure, an HRTF parameter is modified flexibly according to audio effect requirements of a virtual scene, so that the technical problem that sound localization performed by using an HRTF database of existing hardware in some virtual scenes has undesirable effect is solved, thereby achieving the effect of optimizing three-dimensionally located audio effects.

16 Claims, 5 Drawing Sheets

(51) Int. Cl.
H04S 3/00 (2006.01)
H04S 7/00 (2006.01)
(52) U.S. Cl.
CPC ....... H04S 2400/11 (2013.01); H04S 2400/13 (2013.01); H04S 2420/01 (2013.01)
(58) Field of Classification Search
USPC ..................................... 381/17–19, 300, 310
See application file for complete search history.

(56) References Cited

U.S. PATENT DOCUMENTS

| 8,682,679 | B2 | 3/2014 | Breebaart |
| 8,767,968 | B2 | 7/2014 | Flaks |
| 2002/0196947 | A1 | 12/2002 | Lapicque |
| 2003/0021428 | A1* | 1/2003 | Abe ......................... H04R 3/12 381/97 |
| 2007/0127730 | A1* | 6/2007 | Kim ......................... H04S 1/002 381/60 |
| 2010/0191537 | A1 | 7/2010 | Breebaart |
| 2010/0290636 | A1 | 11/2010 | Mao |
| 2011/0154350 | A1* | 6/2011 | Doyle .................. G06F 9/5044 718/104 |
| 2012/0022842 | A1 | 1/2012 | Amadu |
| 2012/0093320 | A1 | 4/2012 | Flaks |
| 2013/0170679 | A1 | 7/2013 | Nystrom |

FOREIGN PATENT DOCUMENTS

| CN | 101690269 A | 3/2010 |
| CN | 102413414 A | 4/2012 |
| CN | 102665156 A | 9/2012 |
| CN | 102918466 A | 2/2013 |
| JP | 2004147283 A | 5/2004 |
| WO | WO2009001277 * | 12/2008 |
| WO | 2010135179 A1 | 11/2010 |
| WO | 2012168765 A1 | 12/2012 |
| WO | 2013142668 A1 | 9/2013 |

OTHER PUBLICATIONS

English Translation of the Written Opinion of the International Search Authority in international application No. PCT/CN2015/073282, dated May 13, 2015.
Partial Supplementary European Search Report in European application No. 15754824.9, dated May 15, 2017.
Notification of the First Office Action of Chinese application No. 201410067291.6, dated Aug. 28, 2017.
Supplementary European Search Report in European application No. 15754824.9, dated Aug. 16, 2017.

* cited by examiner

METHOD AND APPARATUS FOR SOUND PROCESSING IN THREE-DIMENSIONAL VIRTUAL SCENE

CROSS-REFERENCE TO RELATED APPLICATIONS

This application is a National Stage entry of International Application No. PCT/CN2015/073282, filed Feb. 26, 2015, which claims priority to Chinese Patent Application No. 201410067291.6, filed Feb. 26, 2014. The disclosures of the priority applications are incorporated in their entirety herein by reference.

FIELD OF THE TECHNOLOGY

The present disclosure relates to the field of sound localization processing, and in particular, to a method and an apparatus for sound processing in a three-dimensional virtual scene.

BACKGROUND OF THE DISCLOSURE

A head-response transfer function (HRTF) is a processing technology for sound localization, which measures change data obtained, through human ears, for sounds at different azimuths, makes statistics, and performs calculation to obtain a human ear perception model.

With two ears, human can locate a sound from a three-dimensional space because of an analysis system of the human ears for a sound signal. Such a signal analysis system obtains sound localization information by means of the filtering effect of the human body on a sound wave. Theoretically, the human ear perception and localization of a sound in the real three-dimensional world can be precisely simulated by measuring the effects imposed on the sound by processing such as filtering and delaying of the human body and then simulating the effects of the human body when a playback system (an earphone or speaker) is used to play the sound.

The measurement is currently accomplished by making an artificial head. A prosthesis highly simulating the density and material of the human body is used, an audio difference in sound reception of a sound wave at a fixed azimuth transmitted to prosthetic ears of the artificial head is recorded, and an HRTF is obtained through statistics.

The measured data includes: an inter aural time delay (ITD), an inter aural amplitude difference (IAD), an inter intensity difference (IID), and spectral cues.

In existing 3D audio effect processing, if sound card hardware has an HRTF computing chip, when modulating and playing a sound source to a sound recipient, a three-dimensional engine uses an HRTF to perform three-dimensional localization processing, so as to achieve a realistic three-dimensional localization effect for the sound recipient.

In the existing 3D audio effect processing, HRTF computing can be performed by using a computing chip possessing an HRTF, so that a user gets three-dimensional localization experience in the sense of hearing. However, because HRTF databases of the hardware are basically derived from measurement of a real environment, they are not suitable for sound processing in some virtual scenes. For example, in a virtual scene of a game program, to achieve a specific visual effect, some exaggeration means are usually used in composition, so that the volume proportion of objects may differ from the actual volume proportion in the real world. For another example, in a first person shooting game, a player requires exaggerated sounds of footsteps for localization, so as to determine locations of other players. However, sound localization performed in such virtual scenes by the HRTF supported by the existing hardware has undesirable effect most of the time.

There is no effective solution to the foregoing problem currently.

SUMMARY

Embodiments of the present invention provide a method and an apparatus for sound processing in a three-dimensional virtual scene, so as to at least solve the technical problem that sound localization performed by using an HRTF database of existing hardware in some virtual scenes has undesirable effect.

According to one aspect of the embodiments of the present invention, a method for sound processing in a three-dimensional virtual scene is provided, including: acquiring, by a three-dimensional program engine, a sound processing request of a sound source point in a virtual scene; invoking a corresponding HRTF according to a three-dimensional coordinate position relationship between the sound source point and a sound recipient in the virtual scene; modifying a parameter value of the HRTF according to the virtual scene where the sound source point is located; and performing filtering and delaying processing on a sound signal of the sound source point by using the modified HRTF.

According to another aspect of the embodiments of the present invention, an apparatus for sound processing in a three-dimensional virtual scene is further provided, including: an acquisition module, configured to acquire a sound processing request of a sound source point in a virtual scene; an invoking module, configured to invoke a corresponding HRTF according to a three-dimensional coordinate position relationship between the sound source point and a sound recipient in the virtual scene; a modifying module, configured to modify a parameter value of the HRTF according to the virtual scene where the sound source point is located; and a processing module, configured to perform filtering and delaying processing on a sound signal of the sound source point by using the modified HRTF.

In the embodiments of the present invention, during HRTF computing on a sound source point, requirements of a virtual scene where the sound source point is located are taken into consideration, and a parameter value of an HRTF is modified according to the virtual scene, thereby solving the technical problem that sound localization performed by using an HRTF database of existing hardware in some virtual scenes has undesirable effect.

BRIEF DESCRIPTION OF THE DRAWINGS

The drawings illustrated herein provide a further understanding of the present disclosure and form a part of the present application. The exemplary embodiments of the present invention and the description thereof are used to explain the present disclosure without unduly limiting the present disclosure. In the drawings.

DESCRIPTION OF EMBODIMENTS

To make a person skilled in the art better understand the solutions of the present disclosure, the following clearly and completely describes the technical solutions in the embodiments of the present invention with reference to the accompanying drawings in the embodiments of the present invention. Apparently, the described embodiments are some of but not all of the embodiments of the present invention. All other embodiments obtained by a person of ordinary skill in the art based on the embodiments of the present invention without creative efforts shall fall within the protection scope of the present disclosure.

It should be noted that the terms such as "first" and "second" in the specification and claims of the present disclosure and the aforementioned drawings are used to differentiate similar objects, and do not need to describe any specific sequence or precedence. It should be understood that such data can be interchanged where appropriate so that the embodiments of the present invention described herein can be implemented in other sequences than those shown or described herein. Besides, the terms "include", "have", and any variants thereof are intended to cover a non-exclusive inclusion. For example, a process, method, system, product, or device that includes a series of steps or units is not limited to only including those clearly listed steps or units, and may also include other steps or units that are not clearly listed or inherent to the process, method, product, or device.

Embodiment 1

This embodiment of the present invention provides a method for sound processing in a three-dimensional virtual scene. The virtual scene involved in this embodiment may be a virtual scene in a game program including an online game, a mobile game, and so on, and may also be a virtual scene in a simulation training program in other professional fields, including an aviation simulation training program, and an auto simulation training program.

Figure 1:
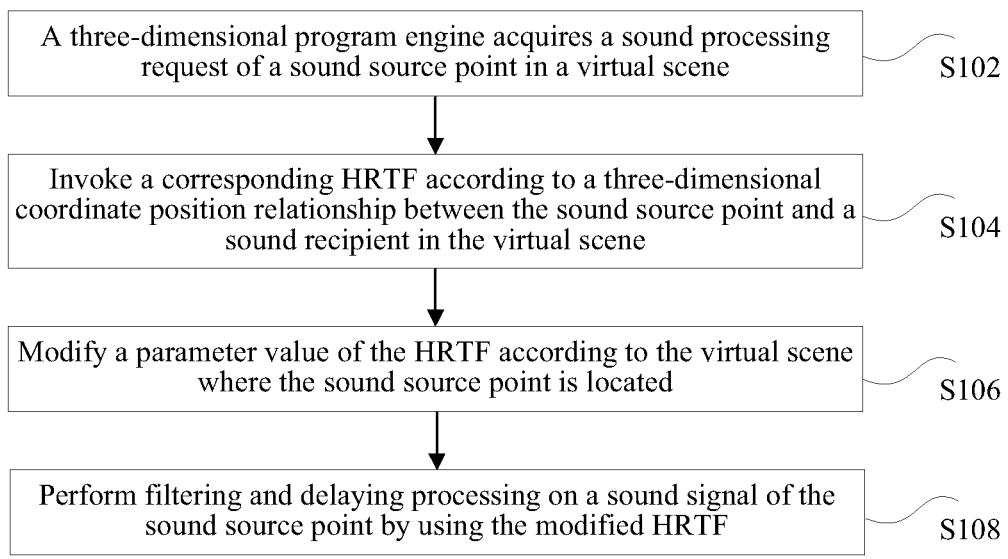
FIG. 1 is a flowchart of a method for sound processing in a three-dimensional virtual scene according to Embodiment 1 of the present invention.

As shown in FIG. 1, the sound processing method includes the following steps:

Step S102: A three-dimensional program engine acquires a sound processing request of a sound source point in a virtual scene.

The three-dimensional program engine is a term in 3D audio effect processing. The three-dimensional engine may have a variety of forms, and usually refers to software or hardware or a combination of software and hardware having an HRTF computing capability, for example, sound card hardware having an HRTF computing chip in this embodiment. During audio effect processing, the three-dimensional program engine may obtain the sound processing request of the sound source point.

Step S104: Invoke a corresponding HRTF according to a three-dimensional coordinate position relationship between the sound source point and a sound recipient in the virtual scene.

When obtaining a playing triggering request of the sound source point, the three-dimensional program engine may apply a corresponding HRTF according to an elevation angle, an azimuth angle, and a distance between the sound source point and the sound recipient, so as to perform pre-processing on the sound, thereby achieving a realistic three-dimensional localization effect for the sound recipient.

Step S106: Modify a parameter value of the HRTF according to the virtual scene where the sound source point is located.

Because three-dimensional sound localization processing is performed on the sound source point in the virtual scene in this embodiment, in order to enhance the three-dimensional localization experience, an HRTF database needs to be optimized and modified according to audio effect requirements in the virtual scene.

For example, in a first person shooting game, a player requires exaggerated sounds of footsteps for localization, so as to determine locations of other players, but an original HRTF cannot meet the audio effect requirements of the virtual scene. As a result, the HRTF needs to be re-modified to adjust a parameter value, in the HRTF, for representing the intensity of sound of footsteps, so that the player gains better three-dimensional sound localization experience.

In another preferred embodiment of the present invention, to achieve a specific visual effect, some exaggeration means are used in the composition of a virtual scene, for example, a proportional relationship between a monster and a background object (for example, a house, a road, and so on) in the virtual scene differs from an actual proportional relationship in the real world, causing an error in HRTF-involved calculation of sound card hardware. Therefore, the HRTF needs to be re-modified to achieve a better three-dimensional sound localization effect.

Step S108: Perform filtering and delaying processing on a sound signal of the sound source point by using the modified HRTF.

In the foregoing embodiment, a three-dimensional program engine is used to apply HRTF computing during located playing of a sound source point, and perform sound processing such as signal filtering and delaying on the sound according to localization information of a sound recipient during pre-output, and the three-dimensional program engine may modify an HRTF parameter flexibly according to audio effect requirements of a virtual scene, thereby achieving the effect of optimizing three-dimensionally located audio effects.

Embodiment 2

A process of processing a sound signal of a sound source point in this embodiment is basically the same as that in Embodiment 1, and will not be described herein again. This embodiment differs from Embodiment 1 in that: in Embodiment 2, several groups of HRTF databases with different computing intensities are set, and a user can make a choice according to the performance of a used computer, which ensures not only the fluency of three-dimensionally located audio effects in use but also the optimal sound localization effect.

Figure 2:
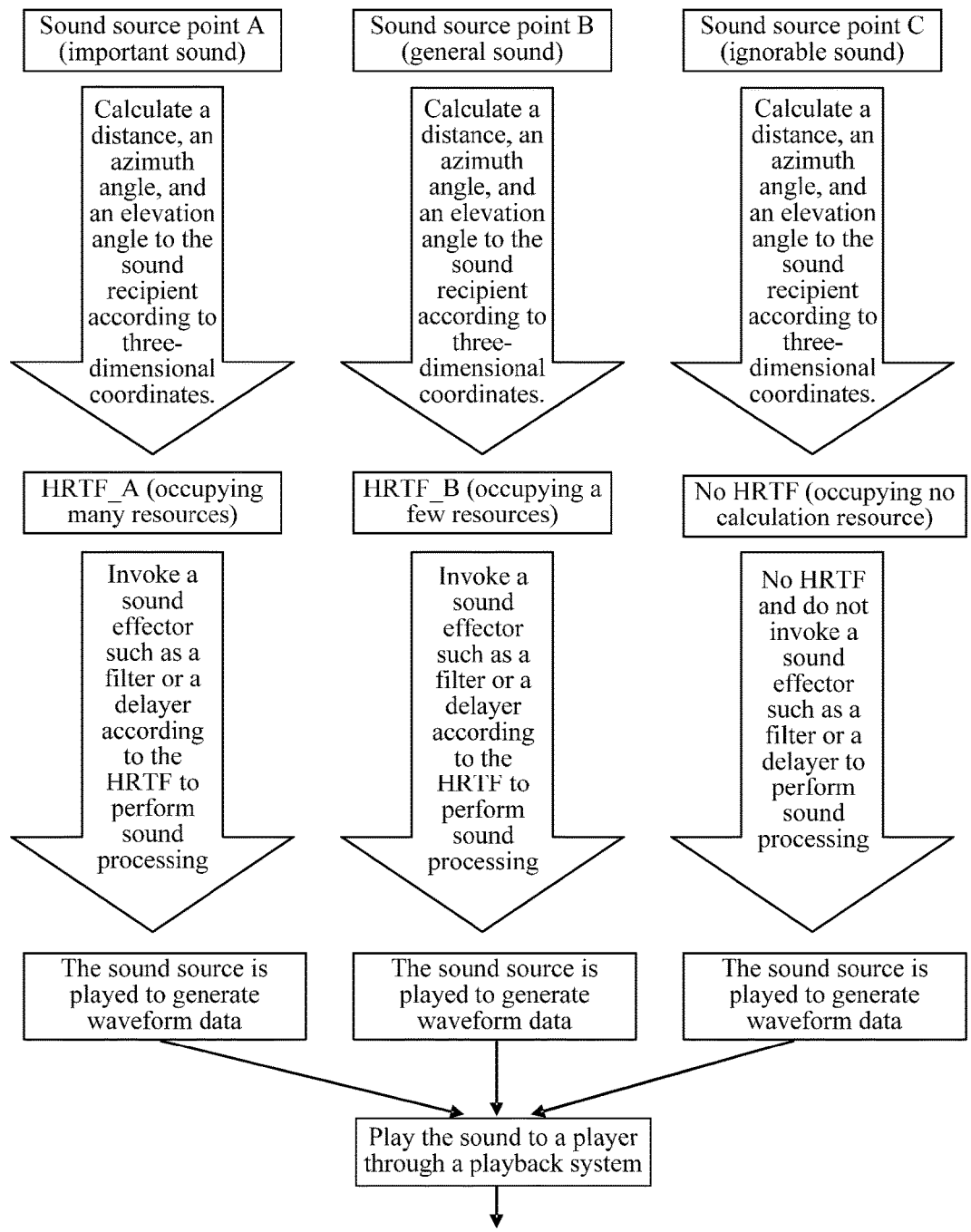
FIG. 2 is a flowchart of a method for sound processing in a three-dimensional virtual scene according to Embodiment 2 of the present invention.

As shown in FIG. 2, using three different sound source points as an example, a sound source point A denotes an important sound, a sound source point B denotes a general sound, and a sound source point C denotes an ignorable sound. In this embodiment, different HRTF databases are set for the sound source points A and B, an HRTF used by the sound source point A occupies a large resource, an HRTF used by the sound source point B occupies a small resource, and no HRTF calculation is performed for the sound source point C due to its low importance. By using classified setting in this embodiment, resources can be saved, and optimization and modification are performed according to the different content played by the sound sources, so as to achieve the purpose of enhancing three-dimensional sound localization experience. It should be emphasized that HRTFs may be set according to actual requirements, for example, instead of setting several groups of HRTF databases with different computing intensities, HRTFs of a same HRTF database may be classified by priority, and resources are allocated according to the priorities, or the two manners are combined. Certainly, there are other similar HRTF resource configuration manners.

Embodiment 3

The description of this embodiment focuses on a process of playing, through a sound playback system, the sound signal processed by the HRTF.

In the foregoing embodiments, calculation is performed in a three-dimensional program engine according to three-dimensional coordinate positions of a sound source point and a sound recipient, while an HRTF is measured based on two ears of an artificial head; therefore, a surround sound multi-channel playback system needs to perform conversion and playing based on dual channels.

In the surround sound multi-channel playback system, a dual-channel signal processed by the HRTF is divided into a left-channel signal and a right-channel signal. In the case of the multi-channel playback system, multiple sets of mirrored dual channels may also be grouped separately.

According to the requirements for determining a location of a current sound source point, the signal processed by the HRTF is allocated, according to information about an azimuth angle to the sound recipient of the sound source point during playing, to corresponding mirrored dual channels for playback.

Figure 3:
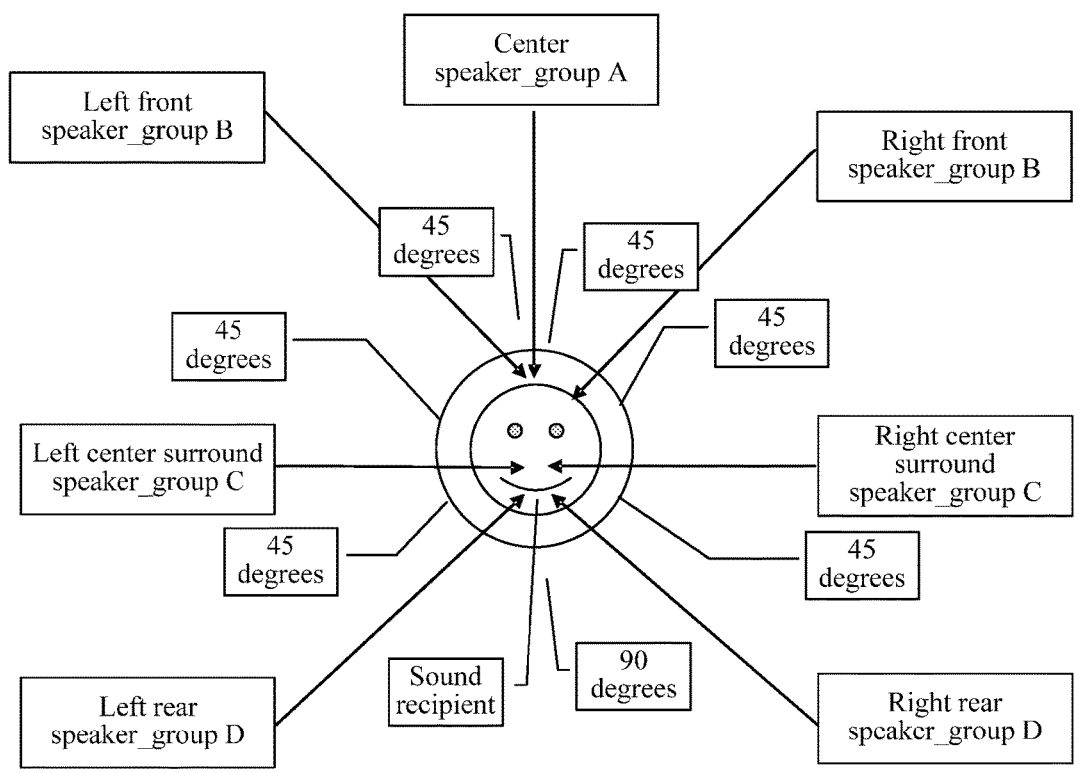
FIG. 3 is a schematic diagram of a sound playback system according to Embodiment 3 of the present invention.

In this embodiment, using a 7.1 surround sound playback system as an example, as shown in FIG. 3: a sound recipient is mapped to the center of speaker groups, a center speaker A is mapped to the front provided that the front of the sound recipient is at an azimuth angle of 0 degree; a left front speaker is mapped to the left front with an angle of 45 degrees provided that the front of the sound recipient is at an azimuth angle of 0 degree; a right front speaker is mapped to the right front with an angle of 45 degrees provided that the front of the sound recipient is at an azimuth angle of 0 degree; a left center surround speaker is mapped to the left with an angle of 90 degrees provided that the front of the sound recipient is at an azimuth angle of 0 degree; a right center surround speaker is mapped to the right with an angle of 90 degrees provided that the front of the sound recipient is at an azimuth angle of 0 degree; a left rear speaker is mapped to the left rear with an angle of 45 degrees provided that the front of the sound recipient is at an azimuth angle of 0 degree; a right rear speaker is mapped to the right rear with an angle of 45 degrees provided that the front of the sound recipient is at an azimuth angle of 0 degree. Mirrored dual channels form one group, namely, the center speaker alone forms a group A (the center speaker may have dual channels), the left front speaker and the right front speaker form a group B, the left center surround speaker and the right center surround speaker form a group C, and the left rear speaker and the right rear speaker form a group D.

A three-dimensional program engine allocates a dual-channel playback signal to the speaker groups A, B, C, and D in the aforementioned figure at the same time, and performs volume modulation on the different speaker groups according to an azimuth angle between the sound source point and the sound recipient, and in an area between two neighboring speaker groups, the volume is linearly cross-fade modulated from 0 to −6 DB, and a maximum difference of playing volume is −6 DB.

For example, when the sound source point is played at the left front with an angle of 45 degrees provided that the front of the sound recipient is at an azimuth angle of 0 degree, an azimuth angle relationship between the 45-degree sound source point at the left front and the sound recipient moves to 90 degrees at the left, the left center surround speaker and the right center surround speaker linearly gain to 0 DB of the original signal for playing, the left front speaker and the right front speaker linearly attenuate to −6 DB, the left rear speaker and the right rear speaker linearly attenuate to −6 DB, and the center speaker linearly attenuates to −12 DB.

In this embodiment, volume modulation does not need to be performed on the same speaker group, because located playing of a sound has been processed inside the three-dimensional program engine according to the three-dimensional coordinate of the sound source point.

It should be noted that the preceding method embodiments are all expressed as a series of operations for ease of description. However, a person skilled in the art should know that the present disclosure is not limited to the sequence of the operations described, because some steps may be performed in other sequences or concurrently according to the present disclosure. Furthermore, a person skilled in the art also should know that all the embodiments described in the specification are preferred embodiments, and the operations and modules involved may not be necessary for the present disclosure.

Through the above descriptions of the embodiments, a person skilled in the art can clearly understand that the methods according to the above embodiments may be implemented by software plus a necessary universal hardware platform, and certainly may also be implemented by hardware, but in most cases, the former is the preferred implementation manner. Based on such an understanding, the technical solutions of the present disclosure essentially, or the part contributing to the prior art may be embodied in the form of a software product. The computer software product is stored in a storage medium (such as a read-only memory (ROM)/random access memory (RAM), a magnetic disk, or an optical disc), and includes several instructions for instructing a terminal device (which may be a mobile phone, a computer, a server, a network device, or the like) to perform the methods in the embodiments of the present invention.

Embodiment 4

Figure 4:
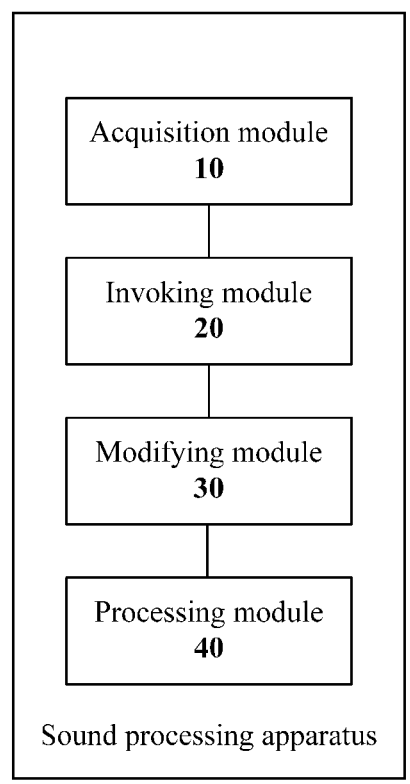
FIG. 4 is a schematic diagram illustrating a modular structure of an apparatus for sound processing in a three-dimensional virtual scene according to Embodiment 4 of the present invention.

This embodiment of the present invention further provides a sound processing apparatus for implementing the foregoing sound processing in a three-dimensional virtual scene. As shown in FIG. 4, the apparatus includes an acquisition module 10, an invoking module 20, a modifying module 30, and a processing module 40. The acquisition module 10, the invoking module 20, the modifying module 30, and processing module 40 are functionally coupled.

The acquisition module 10 is configured to acquire a sound processing request of a sound source point in a virtual scene. The invoking module 20 is configured to invoke a corresponding HRTF according to a three-dimensional coordinate position relationship between the sound source point and a sound recipient in the virtual scene. The modifying module 30 is configured to modify a parameter value of the HRTF according to the virtual scene where the sound source point is located. The processing module 40 is configured to perform filtering and delaying processing on a sound signal of the sound source point by using the modified HRTF.

In this embodiment, the acquisition module 10, the invoking module 20, the modifying module 30, and the processing module 40 can functionally implement the function of the three-dimensional program engine in the foregoing method embodiments.

In the foregoing embodiment, the modifying module 30 is introduced to modify an HRTF parameter flexibly according to audio effect requirements of the virtual scene, thereby optimizing the three-dimensional sound localization experience.

Embodiment 5

Figure 5:
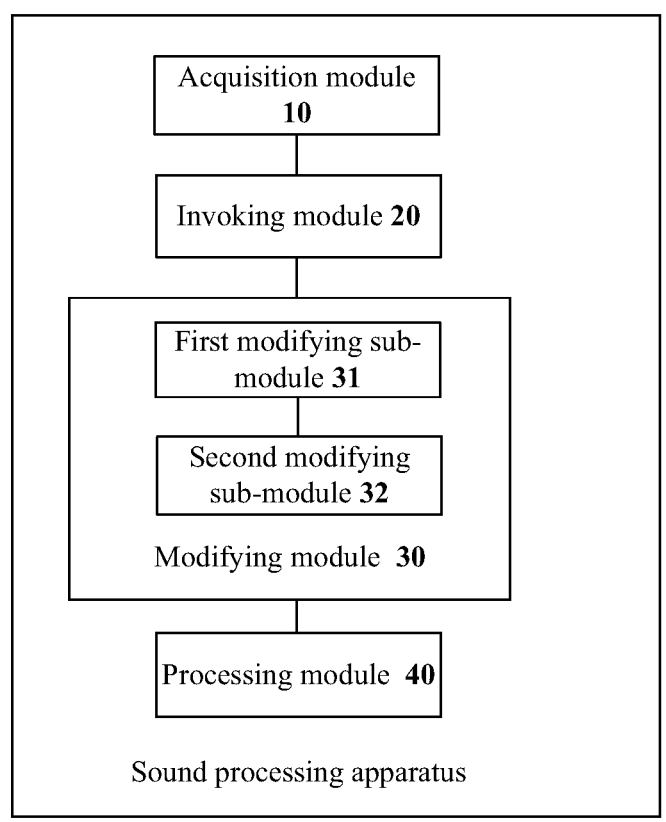
FIG. 5 is a schematic diagram illustrating a modular structure of an apparatus for sound processing in a three-dimensional virtual scene according to Embodiment 5 of the present invention.

FIG. 5 is a schematic diagram illustrating a modular structure of an apparatus for sound processing in a three-dimensional virtual scene according to Embodiment 5 of the present invention. As shown in FIG. 5, this embodiment includes the acquisition module 10, the invoking module 20, the modifying module 30, and the processing module 40 in the foregoing Embodiment 4. The functions implemented by the functional modules are similar to those in Embodiment 4, and will not be described herein again. The sound processing apparatus in Embodiment 5 differs from that in Embodiment 4 merely in that: in Embodiment 5, the modifying module 30 further includes two sub-modules for modifying an HRTF in a specific virtual scene, namely, a first modifying sub-module 31 and a second modifying sub-module 32.

The first modifying sub-module 31 is configured to adjust the parameter value of the HRTF according to a sound effect that the sound source point is required to present in the specific virtual scene. The second modifying sub-module 32 is configured to adjust the parameter value of the HRTF according to a difference between a size proportional relationship of objects in the virtual scene where the sound source point is located and an actual size proportional relationship of objects in a real environment.

In this embodiment, the first modifying sub-module 31 or the second modifying sub-module 32 may be used to optimize and modify an HRTF database according to audio effect requirements in a virtual scene, so as to enhance the three-dimensional localization experience.

For example, in a first person shooting game, a player requires exaggerated sounds of footsteps for localization, so as to determine locations of other players, but an original HRTF cannot meet the audio effect requirements of the virtual scene. As a result, the first modifying sub-module 31 may be used to re-modify the HRTF to adjust a parameter value, in the HRTF, for representing the intensity of sound of footsteps, so that the player gains better three-dimensional sound localization experience.

In another preferred embodiment of the present invention, to achieve a specific visual effect, some exaggeration means are used in the composition of a virtual scene, for example, a proportional relationship between a monster and a background object (for example, a house, a road, and so on) in the virtual scene differs from an actual proportional relationship in the real world, causing an error in HRTF-involved calculation of sound card hardware. Therefore, the second modifying sub-module 32 may be used to re-modify the HRTF to achieve a better three-dimensional sound localization effect.

In another preferred embodiment of the present invention, the sound processing apparatus may further include a playback system (not shown in the figure) configured to play the sound signal processed by the HRTF. The playback system may have dual channels or multiple channels, for example, a 7.1 surround sound playback system. In the 7.1 surround sound playback system, a center speaker forms one group, a left front speaker and a right front speaker form one group, a left center surround speaker and a right center surround speaker form one group, a left rear speaker and a right rear speaker form one group, and a maximum difference of playing volume is −6 DB between two neighboring speaker groups.

In the present disclosure, calculation is performed in a three-dimensional program engine according to three-dimensional coordinate positions of a sound source point and a sound recipient, while an HRTF is measured based on two ears of an artificial head; therefore, a surround sound multi-channel playback system needs to perform conversion and playing based on dual channels, so as to achieve an optimal three-dimensional sound localization effect.

In the technical solutions described in the foregoing embodiments of the present invention, a three-dimensional program engine is used to introduce HRTF computing during located playing of a sound source point, and perform sound processing such as signal filtering and delaying on the sound according to localization information of a sound recipient during pre-output, and the three-dimensional program engine may modify an HRTF parameter according to localization of different sounds flexibly, thereby optimizing the three-dimensional sound localization experience, and may enhance or ignore HRTF calculation according to the importance of a sound in a virtual scene, thereby achieving rational use of resources.

It should be noted that the sequence numbers of the foregoing embodiments of the present invention are merely for the convenience of description, and do not imply the preference among the embodiments.

In the foregoing embodiments of the present invention, the descriptions of the embodiments place different emphasis on different aspects, and for a part that is not detailed in an embodiment, reference may be made to the relevant descriptions of other embodiments.

In the several embodiments provided in the present application, it should be understood that the disclosed sound processing apparatus may be implemented in other manners. The described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the units or modules may be implemented in electrical or other forms.

The units described as separate parts may or may not be physically separate, and the parts displayed as units may or may not be physical units, may be located in one position, or may be distributed on a plurality of network units. A part of or all of the units may be selected according to actual needs to achieve the objectives of the solutions of the embodiments.

In addition, the functional units in the embodiments of the present invention may be integrated into one processing unit, or each of the units may exist alone physically, or two or more units may be integrated into one unit. The integrated unit may be implemented in the form of hardware, or may be implemented in the form of a software functional unit.

If the integrated unit is implemented in the form of a software functional unit and sold or used as an independent product, the unit may be stored in a computer-readable storage medium. Based on such an understanding, the technical solutions of the present disclosure essentially, or the part contributing to the prior art, or a part or all of the technical solutions may be embodied in the form of a software product. The computer software product is stored in a storage medium and includes several instructions for instructing a computer device (which may be a personal computer, a server, a network device, or the like) to perform all or a part of the steps of the methods described in the embodiments of the present invention. The foregoing storage medium includes: any medium that can store program code, such as a USB flash drive, a ROM, a RAM, a removable hard disk, a magnetic disk, or an optical disc.

The foregoing descriptions are merely preferred embodiments of the present invention. It should be noted that a person of ordinary skill in the art may make improvements and modifications without departing from the principle of the present disclosure. Such improvements and modifications should be construed as falling within the protection scope of the present disclosure.

What is claimed is:

1. A method for sound processing in a three-dimensional virtual scene, comprising:
   acquiring, by a three-dimensional program engine, a sound processing request of a sound source point in a virtual scene;
   invoking a corresponding head-response transfer function (HRTF) according to a three-dimensional coordinate position relationship between the sound source point and a sound recipient in the virtual scene;
   modifying a parameter value of the HRTF according to the virtual scene where the sound source point is located; and
   performing filtering and delaying processing on a sound signal of the sound source point by using the modified HRTF,
   wherein the modifying a parameter value of the HRTF according to the virtual scene where the sound source point is located comprises:
   adjusting the parameter value of the HRTF according to a difference between a size proportional relationship between an object, which is the sound source point, and other objects in the virtual scene where the sound source point is located, and an actual size proportional relationship between an object, which is corresponding to the sound source point, and other objects in a real environment.

2. The sound processing method according to claim 1, wherein the modifying a parameter value of the HRTF according to the virtual scene where the sound source point is located comprises:
   adjusting the parameter value of the HRTF according to a sound effect that the sound source point is required to present in a specific virtual scene.

3. The sound processing method according to claim 2, wherein the adjusting the parameter value of the HRTF comprises:
   adjusting a parameter value, in the HRTF, for representing a sound intensity of the sound source point.

4. The sound processing method according to claim 1, wherein the three-dimensional coordinate position relationship comprises: an elevation angle, an azimuth angle, and a distance between the sound source point and the sound recipient.

5. The sound processing method according to claim 1, wherein before the invoking a corresponding HRTF according to a three-dimensional coordinate position relationship between the sound source point and a sound recipient in the virtual scene, the method further comprises:
   presetting multiple HRTF databases with different computing intensities, and invoking an HRTF in a corresponding HRTF database according to a computing capability of a system.

6. The sound processing method according to claim 1, wherein before the invoking a corresponding HRTF according to a three-dimensional coordinate position relationship between the sound source point and a sound recipient in the virtual scene, the method further comprises:
   classifying the sound source points by priority, and when performing filtering and delaying processing on the sound signal of the sound source point by using the HRTF, allocating a corresponding computing resource to the HRTF according to a priority level.

7. The sound processing method according to claim 1, wherein after the performing filtering and delaying processing on a sound signal of the sound source point by using the modified HRTF, the method further comprises:
   playing, through a sound playback system, the sound signal that is processed by using the HRTF.

8. The sound processing method according to claim 7, wherein the playing, through a sound playback system, the sound signal that is processed by using the HRTF comprises:
   grouping speakers of the sound playback system; and
   performing volume adjustment on different speaker groups according to an azimuth angle between the sound source point and the sound recipient.

9. The sound processing method according to claim 8, wherein the performing volume adjustment on different speaker groups according to an azimuth angle between the sound source point and the sound recipient comprises:
   a maximum difference of playing volume being −6 DB between two neighboring speaker groups.

10. The sound processing method according to claim 8, wherein the sound playback system is a 7.1 surround sound playback system, a center speaker forms one group, a left front speaker and a right front speaker form one group, a left center surround speaker and a right center surround speaker form one group, a left rear speaker and a right rear speaker form one group, volume adjustment is not performed on the same speaker group, and the volume is linearly cross-fade modulated from 0 to −6 DB between two neighboring speaker groups.

11. An apparatus for sound processing in a three-dimensional virtual scene, comprising:
    an acquisition module, configured to acquire a sound processing request of a sound source point in a virtual scene;
    an invoking module, configured to invoke a corresponding head-response transfer function (HRTF) according to a three-dimensional coordinate position relationship between the sound source point and a sound recipient in the virtual scene;

a modifying module, configured to modify a parameter value of the HRTF according to the virtual scene where the sound source point is located; and a processing module, configured to perform filtering and delaying processing on a sound signal of the sound source point by using the modified HRTF, wherein the modifying module comprises:

a second modifying sub-module, configured to adjust the parameter value of the HRTF according to a difference between a size proportional relationship between an object, which is the sound source point, and other objects in the virtual scene where the sound source point is located, and an actual size proportional relationship between an object, which is corresponding to the sound source point, and other objects in a real environment.

12. The sound processing apparatus according to claim 11, wherein the modifying module comprises:

a first modifying sub-module, configured to adjust the parameter value of the HRTF according to a sound effect that the sound source point is required to present in a specific virtual scene.

13. The sound processing apparatus according to claim 12, wherein the parameter value is a parameter value, in the HRTF, for representing a sound intensity of the sound source point.

14. The sound processing apparatus according to claim 11, wherein the three-dimensional coordinate position relationship comprises: an elevation angle, an azimuth angle, and a distance between the sound source point and the sound recipient.

15. The sound processing apparatus according to claim 11, further comprising:

a sound playback system, configured to play the sound signal that is processed by using the HRTF.

16. The sound processing apparatus according to claim 15, wherein the sound playback system is a 7.1 surround sound playback system, a center speaker forms one group, a left front speaker and a right front speaker form one group, a left center surround speaker and a right center surround speaker form one group, a left rear speaker and a right rear speaker form one group, and a maximum difference of playing volume is −6 DB between two neighboring speaker groups.

* * * * *